United States Patent
Hwang

(10) Patent No.: US 10,020,691 B2
(45) Date of Patent: Jul. 10, 2018

(54) APPARATUS AND METHOD FOR TRANSMITTING POWER WIRELESSLY

(71) Applicant: HITACHI-LG DATA STORAGE KOREA, INC., Seoul (KR)

(72) Inventor: Hosung Hwang, Seoul (KR)

(73) Assignee: HITACHI-LG DATA STORAGE KOREA, INC., Seoul (KR)

( * ) Notice: Subject to any disclaimer, the term of this patent is extended or adjusted under 35 U.S.C. 154(b) by 371 days.

(21) Appl. No.: 14/876,291

(22) Filed: Oct. 6, 2015

(65) Prior Publication Data

US 2016/0099578 A1 Apr. 7, 2016

(30) Foreign Application Priority Data

Oct. 7, 2014 (KR) .................. 10-2014-0135051

(51) Int. Cl.
| | | |
|---|---|---|
| H01F 27/42 | (2006.01) | |
| H01F 37/00 | (2006.01) | |
| H01F 38/00 | (2006.01) | |
| H02J 50/40 | (2016.01) | |
| H02J 7/00 | (2006.01) | |
| H02J 50/12 | (2016.01) | |
| H02J 50/70 | (2016.01) | |
| H01F 38/14 | (2006.01) | |

(52) U.S. Cl.
CPC ............. *H02J 50/40* (2016.02); *H02J 7/00* (2013.01); *H02J 50/12* (2016.02); *H02J 50/70* (2016.02); *H01F 38/14* (2013.01)

(58) Field of Classification Search
CPC ...... H02J 7/00; H02J 7/02; H02J 7/007; H02J 7/025; H02J 5/005; H02J 17/00; H02J 50/10
USPC ..................................................... 307/104, 37
See application file for complete search history.

(56) References Cited

U.S. PATENT DOCUMENTS

| | | | |
|---|---|---|---|
| 9,711,278 B2 * | 7/2017 | Park ..................... | H01F 38/14 |
| 2013/0062961 A1* | 3/2013 | Park ..................... | H02J 17/00 |
| | | | 307/104 |
| 2014/0300189 A1* | 10/2014 | Nakano .................. | H02J 7/025 |
| | | | 307/31 |
| 2015/0042171 A1* | 2/2015 | Kohara .................. | H02J 7/025 |
| | | | 307/104 |
| 2015/0069851 A1* | 3/2015 | Chung ................... | H02J 5/005 |
| | | | 307/104 |

(Continued)

*Primary Examiner* — Rexford Barnie
*Assistant Examiner* — Jagdeep Dhillon
(74) *Attorney, Agent, or Firm* — Birch, Stewart, Kolasch & Birch, LLP

(57) ABSTRACT

The present invention relates to a method and an apparatus for wirelessly transmitting power. A method for wirelessly transmitting power according to an embodiment can measure and store signal strength values corresponding to inductive coupling degrees with a secondary coil of a receiving apparatus sequentially with respect to two or more primary coils included in two or more resonance circuits, select a primary coil related to a largest signal strength value among the signal strength values as an operating coil, adjust a reference value of a power loss value which becomes a basis for entering a mode for detecting power loss based on a difference between a signal strength for a primary coil adjacent to the operating coil and a signal strength value for the operating coil, and transmit power to a wireless power receiving apparatus through the operating coil.

8 Claims, 7 Drawing Sheets

(56) References Cited

U.S. PATENT DOCUMENTS

| | | | |
|---|---|---|---|
| 2015/0137746 A1* | 5/2015 | Lee | H02J 5/005 320/108 |
| 2015/0236526 A1* | 8/2015 | Jadidian | H02J 5/005 320/108 |
| 2015/0263532 A1* | 9/2015 | Van Wageningen | H02J 5/005 307/104 |
| 2016/0149440 A1* | 5/2016 | Staring | H02J 50/10 307/104 |
| 2016/0181818 A1* | 6/2016 | Joye | H02J 5/005 307/104 |
| 2017/0237293 A1* | 8/2017 | Faraone | H02J 50/90 713/300 |

* cited by examiner

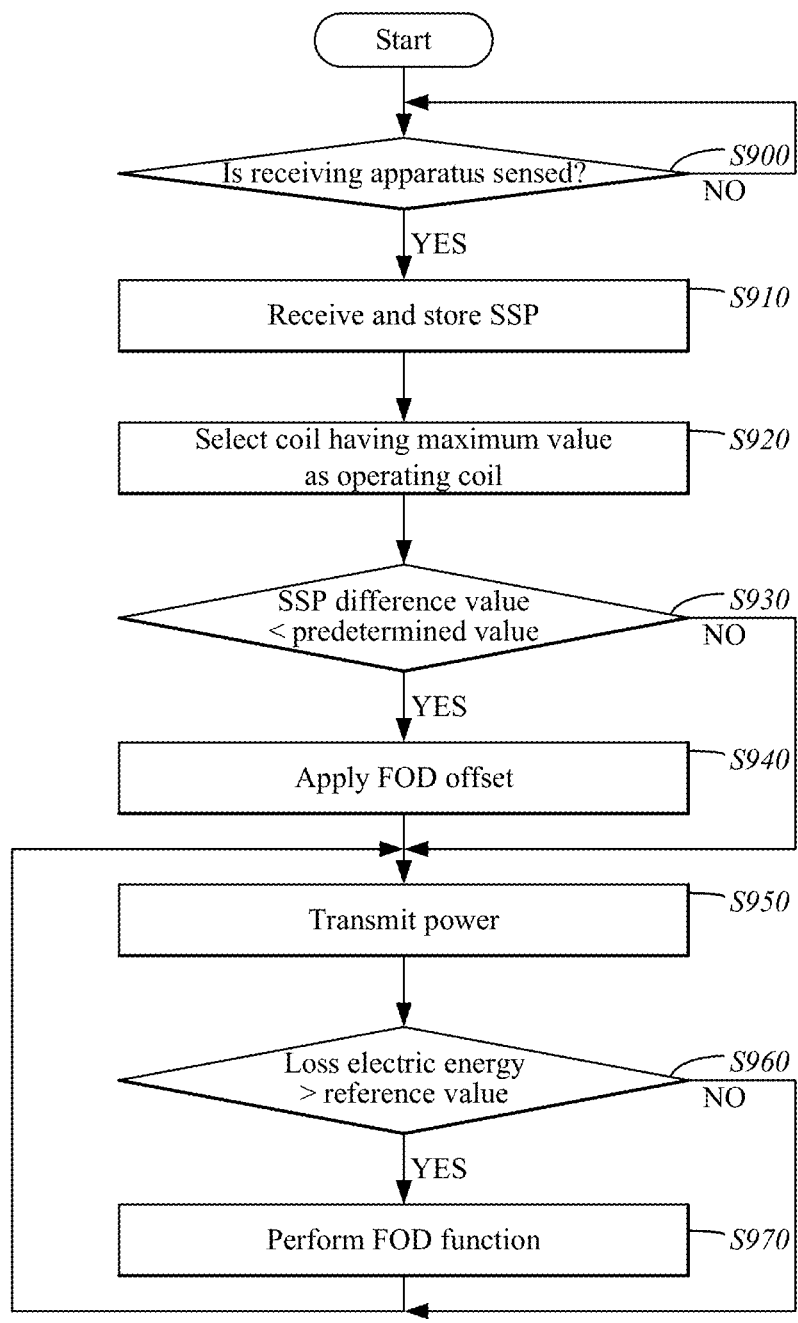

APPARATUS AND METHOD FOR TRANSMITTING POWER WIRELESSLY

BACKGROUND

Field

The present invention relates to an apparatus and a method for transmitting power wirelessly.

Related Art

With the development of communication and information processing technology, the use of a smart terminal such as a smart phone, or the like has gradually increased and a charging scheme primarily applied to the smart terminal at present is a scheme in which an adapter connected to a power source is directly connected to the smart terminal to be charged by receiving external power or connected to the smart terminal through a USB terminal of a host to be charged by receiving USB power of the host.

In recent years, in order to reduce inconvenience that the smart terminal should be directly connected to the adapter or the host through a connection line, a wireless charging scheme in which a battery is wirelessly charged by using magnetic coupling without an electric contact has been gradually applied to the smart terminal.

There are several methods for supplying or receiving electric energy wirelessly, which representatively include an inductive coupling scheme based on an electromagnetic induction phenomenon and an electromagnetic resonance coupling scheme based on an electromagnetic resonance phenomenon by a wireless power signal of a specific frequency.

In both schemes, a communication channel is formed between a wireless charging apparatus and an electronic apparatus such as the smart terminal, which send and receive data to secure stability of power transmission and increase transmission efficiency and in the inductive coupling scheme, a power receiving apparatus moves during wirelessly transmitting the power, and as a result, the transmission efficiency may deteriorate and in the resonance coupling scheme, noise is generated in the communication channel, and as a result, a phenomenon may occur, in which the power transmission is stopped.

In the resonance coupling scheme, a time is further required for actualization and standardization is also slowly progressed, but in the inductive coupling scheme, standardization and commercialization of the technology are rapidly progressed.

In recent years, a foreign object detection (FOD) function to detect the power loss which occurs due to a foreign object laid between a transmitted and a receiver should be requisitely implemented in a product to which a wireless charging standard (WPC 1.1) of the inductive coupling scheme is applied. In a multi-coil type wireless charger, efficiency deteriorates in an overlapping area in which coils overlap with each other and the efficiency deterioration results in the power loss and the application of the FOD function, and as a result, coil switching frequently occurs.

Therefore, as a design purpose of the multi-coil type wireless charger, securing a charging area is difficult, which serves as a failure element in commercialization of a multi coil type product.

SUMMARY

An object of the present invention is to secure stability of wireless power transmission.

Another object of the present invention is to maximally secure a charging area in a multi coil type wireless charger.

Yet another object of the present invention is to reduce unnecessary coil switcings according to an application of a power loss detection function in a coil overlapping area of the multi coil type wireless charger.

In order to achieve the object, a method for transmitting power wirelessly according to an embodiment of the present invention includes: measuring and storing signal strength values corresponding to an inductive coupling degree with a secondary coil of a wireless power receiving apparatus sequentially with respect to two or more primary coils; selecting a primary coil related to a largest signal strength value among the signal strength values as an operating coil; adjusting a reference value of a power loss amount which becomes a basis for entering a mode for detecting power loss based on a difference between a signal strength value for a primary coil adjacent to the operating coil and a signal strength value for the operating coil; and transmitting power to the wireless power receiving apparatus through the operating coil.

An apparatus for transmitting power wirelessly according to an embodiment of the present invention includes: a power conversion unit including an inverter for converting DC power into AC, two or more resonance circuits including a primary coil for transmitting power by magnetic inductive coupling with a secondary coil of a receiving apparatus and a sensing unit for sensing a change of a waveform in the alternative current flowing through the resonance circuit; a switching unit for connecting the two or more resonance circuits to the inverter; and a control unit for selecting a resonance circuit to be connected to the inverter by controlling the switching unit, extracting a message sent by the receiving apparatus based on the change sensed by the sensing unit, and controlling power transmission to the receiving apparatus by controlling an operation of the inverter based on the extracted message, and the control unit measures and stores signal strength values corresponding to inductive coupling degrees with a secondary coil of the receiving apparatus sequentially with respect to two or more primary coils included in the two or more resonance circuits by controlling the switching unit and the power conversion unit, selects a primary coil related to a largest signal strength value among the signal strength values as an operating coil, and adjusts a reference value of a power loss value which becomes a basis for entering a mode for detecting power loss based on a difference between a signal strength for a primary coil adjacent to the operating coil and a signal strength value for the operating coil.

In the embodiment, the control unit decodes a signal strength packet received from the receiving apparatus to acquire the signal strength value.

In the embodiment, when the difference is smaller than a predetermined value, the control unit may adjust the reference value upward.

In the embodiment, the control unit may calculate the power loss amount and enter a mode for detecting the power loss when the calculated power loss amount is larger than the adjusted reference value.

In the embodiment, the control unit may calculate the power loss amount by subtracting received electric energy decoded from a received power packet received from the wireless power receiving apparatus from transmitted electric energy calculated using voltage and current which are input in the resonance circuit including the operating coil.

Accordingly, the charging stop phenomenon decreases in the coil overlapping area of the multi-coil type wireless charger.

Further, the multi-coil type wireless charger can maximally secure the charging area and stably transmit power to increase user satisfaction.

BRIEF DESCRIPTION OF THE DRAWINGS

FIG. 9 illustrates an operational flowchart of a method in which a wireless power transmitting apparatus selects an operating coil and applies an FOD offset according to an embodiment of the present invention.

DETAILED DESCRIPTION

Hereinafter, an embodiment of a wireless power transmitting apparatus according to the present invention will be described in detail with reference to the accompanying drawings.

Figure 1:
FIG. 1 conceptually illustrates that power is wirelessly transmitted from a wireless power transmitting apparatus to an electronic apparatus.

FIG. 1 conceptually illustrates that power is wirelessly transmitted from a wireless power transmitting apparatus to an electronic apparatus.

The wireless power transmitting apparatus 100 may be a power transferring apparatus wirelessly transferring power required by a wireless power receiving apparatus or an electronic apparatus 200 or a wireless charging apparatus for charging a battery by wirelessly transferring the power or be implemented by various types of apparatuses transferring the power to the electronic apparatus 200 requiring the power with non-contact.

The electronic apparatus 200 as an apparatus that may operate by wirelessly receiving the power from the wireless power transmitting apparatus 100 may charge the battery by using the wirelessly received power. The electronic apparatus that wirelessly receives that power may include input/output apparatuses including a portable electronic apparatus, for example, a smart phone or a smart terminal, a tablet computer, a multimedia terminal, a keyboard, a mouse, an auxiliary apparatus of an image or a voice, and the like.

An inductive coupling scheme based on an electromagnetic induction phenomenon by a wireless power signal of the wireless power transmitting apparatus 100, that is, resonance is generated in the electronic apparatus 200 by the wireless power signal transmitted by the wireless power transmitting apparatus 100 and the power may be transferred from the wireless power transmitting apparatus 100 to the electronic apparatus 200 without contact by a resonance phenomenon and a magnetic field is changed by AC current in a primary coil and current is induced to a secondary coil by the electromagnetic induction phenomenon to transfer the power.

When the intensity of the current that flows on the primary coil of the wireless power transmitting apparatus 100 is changed, the magnetic field passing through the primary coil or a transmitting (Tx) coil is changed by the current and the changed magnetic field generates induced electromotive force at the secondary coil or a receiving (Rx) coil in the electronic apparatus 200.

When the wireless power transmitting apparatus 100 and the electronic apparatus 200 are disposed so that the transmitting coil at the wireless power transmitting apparatus 100 and the receiving coil at the electronic apparatus 200 come close to each other and the wireless power transmitting apparatus 100 controls the current of the transmitting coil to be changed, the electronic apparatus 200 supplies the power to a load such as the battery by using the electromotive force induced to the receiving coil.

Since efficiency of wireless power transferring by the inductive coupling scheme is influenced by a layout and a distance between the wireless power transmitting apparatus 100 and the electronic apparatus 200, the wireless power transmitting apparatus 100 is configured to include a flat interface surface and the transmitting coil is mounted on the bottom of the interface surface and one or more electronic apparatuses may be laid on the top of the interface surface. A space between the transmitting coil mounted on the bottom of the interface surface and the receiving coil positioned on the top of the interface surface is significantly small to increase the efficiency of the wireless power transferring by the inductive coupling scheme.

A mark indicating a location where the electronic apparatus is to be laid may be displayed on the top of the interface surface and the mark may indicate the location of the electronic apparatus so that an array is appropriately achieved between the transmitting coil and the receiving coil mounted on the bottom of the interface surface. A protruded structure for guiding the location of the electronic apparatus may be formed on the top of the interface surface and a magnetic body such as a magnet is formed on the bottom of the interface surface to guide the transmitting coil and the receiving coil to be well arrayed by gravitation force with a magnetic body of another pole provided in the electronic apparatus.

Figure 2:
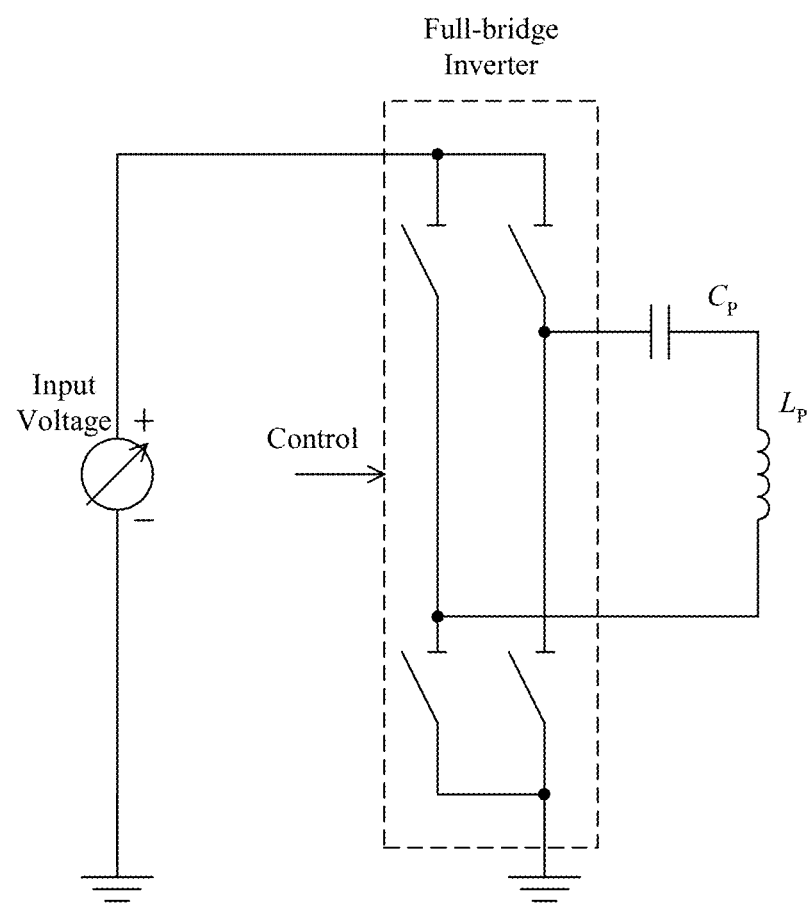
FIG. 2 conceptually illustrates a circuit configuration of a power conversion unit of a transmitting apparatus for wirelessly transmitting power in an electromagnetic induction scheme.

FIG. 2 conceptually illustrates a circuit configuration of a power conversion unit of a transmitting apparatus for wirelessly transmitting power in an electromagnetic induction scheme.

The wireless power transmitting apparatus may be configured to include a power conversion unit generally constituted by a power source, an inverter, and a resonance circuit, and the power source may be a voltage source or a current source and the power conversion unit converts the power supplied from the power source into the wireless power signal and transfers the converted wireless power signal to the receiving apparatus and the wireless power signal is formed in the form of the magnetic field or an electronic magnetic field having a resonance characteristic, and the resonance circuit includes a coil generating the wireless power signal.

The inverter converts a DC input through a switching element and a control circuit into an AC waveform having desired voltage and a desired frequency and in FIG. 2, a full-bridge inverter is illustrated and other types of inverters including a half-bridge inverter, and the like are also available.

The resonance circuit is configured to include a transmitting coil Lp to transmit the power by a magnetic induction scheme and a capacitor Cp and the coil and the capacitor determine a basic resonance frequency of power transmission. The transmitting coil forms the magnetic field corresponding to the wireless power signal with a change of current and may be implemented in a flat form or a solenoid form.

The AC current converted by the inverter drives the resonance circuit, and as a result, the magnetic field is formed in the transmitting coil, the inverter generates AC having a frequency close to the resonance frequency of the resonance circuit to increase transmission efficiency of the transmitting apparatus, and the transmission efficiency of the transmitting apparatus may be changed by controlling the inverter.

Figure 3:
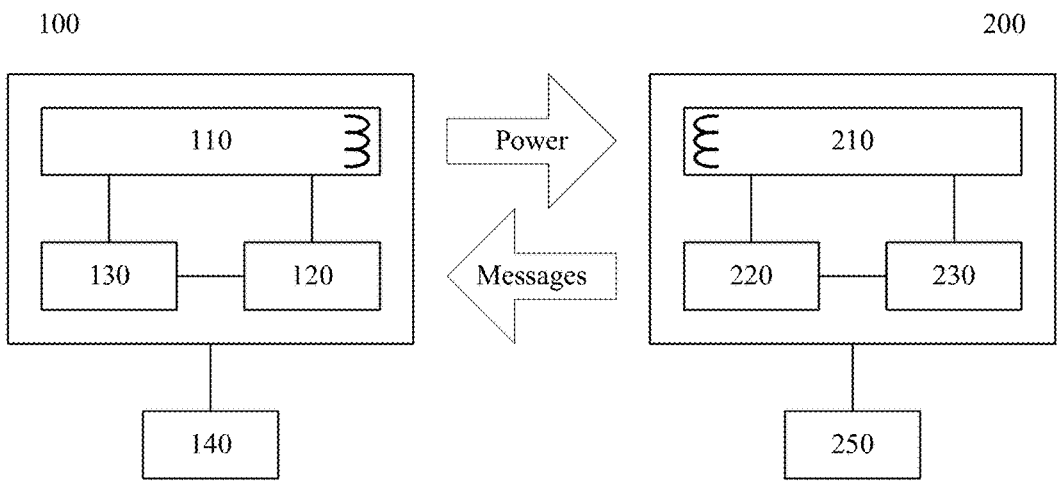
FIG. 3 illustrates a configuration for a wireless power transmitting apparatus and a wireless power receiving apparatus to send and receive power and messages.

FIG. 3 illustrates a configuration for a wireless power transmitting apparatus and a wireless power receiving apparatus to send and receive power and messages.

Since the power conversion unit just transmits the power unilaterally regardless of a receiving state of the receiving apparatus, a configuration for receiving a feedback associated with the receiving state from the receiving apparatus is required in order to transmit the power to suit the state of the receiving apparatus.

The wireless power transmitting apparatus 100 may be configured to include a power conversion unit 110, a communication unit 120, a control unit 130, and a power supply unit 140, the wireless power receiving apparatus 200 may be configured to include a power receiving unit 210, a communication unit 220, and a control unit 230 and configured to further include a load 250 to which received power is to be supplied.

The power conversion unit 110 is constituted by the inverter and the resonance circuit of FIG. 2 and configured to further include a circuit to control characteristics including a frequency, voltage, current, and the like used to form the wires power signal.

The communication unit 120 is connected to the power conversion unit 110 to demodulate the wireless power signal modulated by the receiving apparatus 200 wirelessly receiving the power from the transmitting apparatus 100 in the magnetic induction scheme, thereby detecting a power control message.

The control unit 130 determines one or more characteristics among an operating frequency, voltage, and current of the power conversion unit 110 and controls the power conversion unit 110 based on the message detected by the communication unit 120 to allow the power conversion unit 110 to generate the wireless power signal suitable for the message. The communication unit 120 and the control unit 130 may be configured as one module.

The power receiving unit 210 may include a matching circuit constituted by the receiving coil and the capacitor that generate the inductive electromotive force with the change of the magnetic field generated from the transmitting coil of the power conversion unit 110 and a rectification circuit that rectifies the AC current that flows on the receiving coil to output DC current.

The communication unit 220 of the receiving apparatus is connected to the power receiving unit 210 converts the wireless power signal between the transmitting apparatus and the receiving apparatus by controlling the load of the power receiving unit by controlling a resistive load in the DC and/or a capacitive load in the AC.

The control unit 230 of the receiving apparatus controls each component included in the receiving apparatus, measures an output of the power receiving unit 210 in the current or voltage form and controls the communication unit 220 based on the measured output to transfer the power control message to the wireless power transmitting apparatus 100. The message may indicate the wireless power transmitting apparatus 100 to start or finish transferring the wireless power signal and control a characteristic of the wireless power signal.

The wireless power signal formed by the power conversion unit 110 of the transmitting apparatus is received by the power receiving unit 210, the control unit 230 of the receiving apparatus controls the communication unit 220 to modulate the wireless power signal, and the control unit 230 may perform a modulation process of changing electric energy received from the wireless power signal by changing reactance of the communication unit 220. When the electric energy received from the wireless power signal is changed, current and/or voltage of the power conversion unit 110 forming the wireless power signal is also changed and the communication unit 120 of the wireless power transmitting apparatus 100 may perform a demodulation process by sensing the change in current and/or voltage of the power conversion unit 110.

The control unit 230 of the receiving apparatus generates a packet including a message to be transferred to the wireless power transmitting apparatus 100 and modulates the wireless power signal to include the generate packet, the control unit 130 of the transmitting apparatus may acquire the power control message by decoding a packet extracted through the communication unit 120, and the control unit 230 of the receiving apparatus may transmit a message for requesting a change of the characteristic of the wireless power signal based on the electric energy received through the power receiving unit 210 in order to control the received power.

Figure 4:
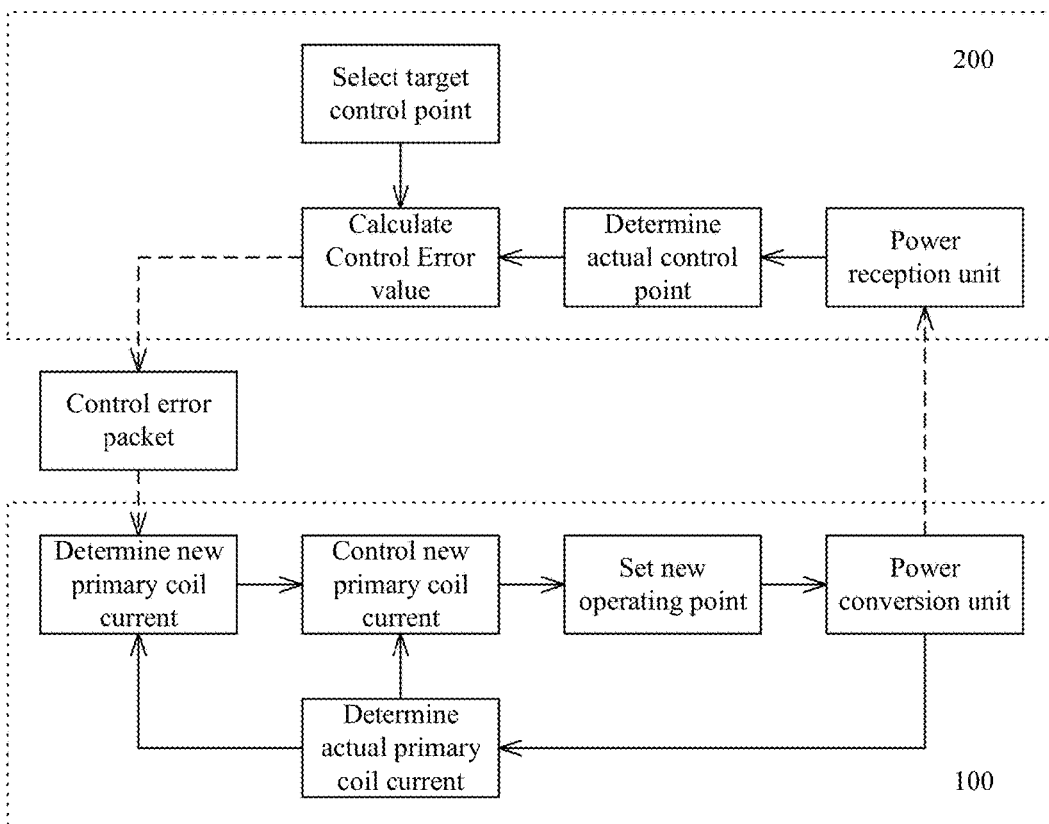
FIG. 4 is a block diagram of a loop for controlling power transmission between a wireless power transmitting apparatus and a wireless power receiving apparatus.

FIG. 4 is a block diagram of a loop for controlling power transmission between a wireless power transmitting apparatus and a wireless power receiving apparatus.

The current is induced by the power receiving unit 210 of the receiving apparatus 200 with the change in magnetic field generated by the power conversion unit 110 of the transmitting apparatus 100 to transmit power and the control unit 230 of the receiving apparatus selects a desired control point, that is, desired output current and/or voltage and determines an actual control point of the power received through the power receiving unit 210.

The control unit 230 of the receiving apparatus calculates a control error value by using the desired control point and the actual control point while the power is transmitted and may have, for example, a difference of two output voltages or currents as a control error value. When low power is required to reach the desired control point, the control error value may be determined to be, for example, a minus value and when more power is required to reach the desired control point, the control error value may be determined to be a plus value. The control unit 230 of the receiving apparatus may generate a packet including a control error value calculated by a method that changes the reactance of the power receiving unit 210 with time and transmit the generated packet to the transmitting apparatus 100 through the communication unit 220.

The communication unit 120 of the transmitting apparatus detects the message by demodulating the packet included in the wireless power signal modulated by the receiving apparatus 200 and may demodulate a control error packet including the control error value.

The control unit 130 of the transmitting apparatus may acquire the control error value by decoding the control error packet extracted through the communication unit 120 and determine a new current value for transmitting power desired by the receiving apparatus by using an actual current value which actually flows on the power conversion unit 110 and the control error value.

When a system is stabilized from the process of receiving the control error packet from the receiving apparatus, the control unit 130 of the transmitting apparatus controls the power conversion unit 110 so that a new operating point, that is, a magnitude, a frequency, a duty ratio, or the like of AC voltage applied to the transmitting coil reaches a new value so that an actual current value which flows on the transmitting coil becomes a new current value and controls a new operating point to be continuously maintained so as for the receiving apparatus to additionally communicate control information or state information.

An interaction between the wireless power transmitting apparatus 100 and the wireless power receiving apparatus 200 is constituted by four steps of selection, ping, identification and configuration, and power transfer and the selection step is a step for the transmitting apparatus to discover an object laid on the surface of an interface, the ping step is a step for verifying whether the object includes the receiving apparatus, the identification and configuration step is a preparation step for sending power to the receiving apparatus in which appropriate information is received and a power transfer contract with the receiving apparatus is made, and the power transfer step is a step of actually transmitting the power to the receiving apparatus wirelessly through the interaction between the transmitting apparatus and the receiving apparatus.

In the ping step, the receiving apparatus 200 transmits a signal strength packet (SSP) indicating a magnetic flux coupling degree of the transmitting coil and the receiving coil through modulation of a resonance waveform and the signal strength packet (SSP) is a message generated by monitoring voltage rectified by the receiving apparatus and the transmitting apparatus 100 may use the message to select an initial driving frequency for power transmission by receiving the message from the receiving apparatus 200.

In the identification and configuration step, the receiving apparatus 200 transmits to the transmitting apparatus 100 an identification packet including a version, a manufacturer code, apparatus identification information, and the like of the receiving apparatus 200, a configuration packet including information including maximum power, a power transmitting method, and the like of the receiving apparatus 200, and the like.

In the power transmitting step, the receiving apparatus 200 transmits to the transmitting apparatus 100 a control error packet (CEP) indicating a difference between an operating point where the receiving apparatus 200 receives a power signal and the operating point determined in the power transfer contract, a received power packet (RPP) indicating an average of the power which the receiving apparatus 200 receives through the surface of the interface, and the like.

The received power packet (RPP) as received electric energy data

The communication unit 120 of the transmitting apparatus extracts the packets from the change in resonance waveform, and the control unit 130 decodes the extracted packet to acquire the message and controls the power conversion unit 110 based thereon to wirelessly transmit the power while changing a power transmission characteristic as the receiving apparatus 200 requests.

Meanwhile, in a scheme that wirelessly transfers the power by inductive coupling, the efficiency thereof is less influenced by a frequency characteristic, but influenced by the array and the distance between the transmitting apparatus 100 and the receiving apparatus 200.

An area which the wireless power signal may reach may be divided into two types and when the transmitting apparatus 100 wirelessly transfers the power to the receiving apparatus 200, a portion on the surface of the interface through which a high-efficiency magnetic field may pass may be referred to as an active area and an area where the transmitting apparatus 100 may sense the existence of the receiving apparatus 200 may be referred to as a sensing area.

The control unit 130 of the transmitting apparatus may sense whether the receiving apparatus 200 is disposed in or removed from the active area or the sensing area and detect whether the receiving apparatus 200 is disposed in the active area or the sensing area by using the wireless power signal formed in the power conversion unit 110 or using a separately provided sensor.

For example, the control unit 130 of the transmitting apparatus monitors whether the power for forming the wireless power signal of the power conversion unit 110 is changed due to the influence of the wireless power signal by the receiving apparatus 200 that exists in the sensing area. The control unit 130 of the transmitting apparatus may perform a process of identifying the receiving apparatus 200 according to a result of detecting the existence of the receiving apparatus 200 or whether to start the wireless power transmission.

The power conversion unit 110 of the transmitting apparatus may further include a positioning unit and the positioning unit may move or rotate the transmitting coil in order to increase the efficiency of the wireless power transfer by the inductive coupling scheme and in particular, be used when the receiving apparatus 200 does not exist in the active area of the transmitting apparatus 100.

The positioning unit may be configured to include a driving unit that moves the transmitting coil so that a distance between the centers of the transmitting coil of the transmitting apparatus 100 and the receiving coil of the receiving apparatus 200 is within a predetermined range or moves the transmitting coil so that the centers of the transmitting coil and the receiving coil overlap with each other. To this end, the transmitting apparatus 100 may further include a sensor or a sensing unit for sensing the position of the receiving apparatus 200 and the control unit 130 of the transmitting apparatus may control the positioning unit based on the positional information on the receiving apparatus 200, which is received from the sensor of the sensing unit.

Alternatively, the control unit 130 of the transmitting apparatus may receive control information regarding the array with or distance from the receiving apparatus 200 through the communication unit 120 and control the positioning unit based thereon.

Further, the transmitting apparatus 100 is formed to include two or more plural transmitting coils to increase transmission efficiency by selectively using some coils arranged appropriately with the receiving coil of the receiving apparatus 200 among the plurality of transmitting coils and in this case, the positioning unit may determine which transmitting coil of the plurality of transmitting coils is used for power transfer.

A single transmitting coil or a combination of one or more transmitting coils forming the magnetic field passing through the active area may be designated as a primary cell and the control unit 130 of the transmitting apparatus may sense the position of the receiving apparatus 200 and determine the active area based thereon, connect a transmitting module configuring the primary cell corresponding to the active area and control the transmitting coil of the transmitting module and the receiving coil of the receiving apparatus 200 to be inductively coupled.

Meanwhile, since the receiving apparatus 200 is embedded in an electronic apparatus such as a smart phone or a smart phone including a multimedia reproduction terminal or a smart apparatus and the electronic apparatus is laid in a direction or a location which is not constant in a vertical or horizontal direction on the surface of the interface of the transmitting apparatus 100, the transmitting apparatus requires a wide active area.

When a plurality of transmitting coil is used in order to widen the active area, driving circuits are required as many as the transmitting coils and controlling the plurality of transmitting coils is complicated, and as a result, the cost of the transmitting apparatus, that is, the wireless charger increases during commercialization. Further, in order to extend the active area, even when a scheme of changing the location of the transmitting coil is applied, since a transport mechanism for shifting the location of the transmitting coil needs to be provided, a volume and a weight increase and manufacturing cost increases.

A method that extends the active area even with one transmitting coil of which the location is fixed is effective, when the size of the transmitting coil is just increased, a magnetic flux density per area decreases and magnetic coupling force between the transmitting and receiving coils is weakened, and as a result, the active area does not increase and the transmission efficiency also deteriorates.

As such, it is important to determine an appropriate shape and an appropriate shape of the transmitting coil for extending the active area and improving the transmission efficiency. A multi-coil scheme adopting two or more transmitting coils is effective as a method that extends the active area of the wireless power transmitting apparatus.

Figure 5:
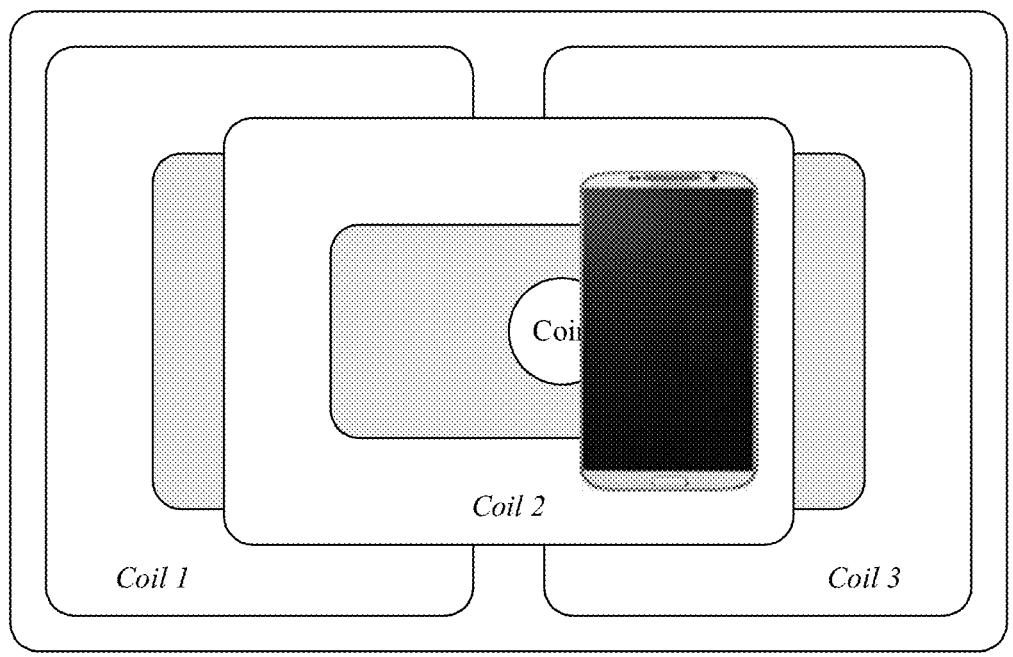
FIG. 5 illustrates a state in which conductive metal is disposed between a multi-coil type wireless power transmitting apparatus and a wireless power receiving apparatus.
Figure 5:
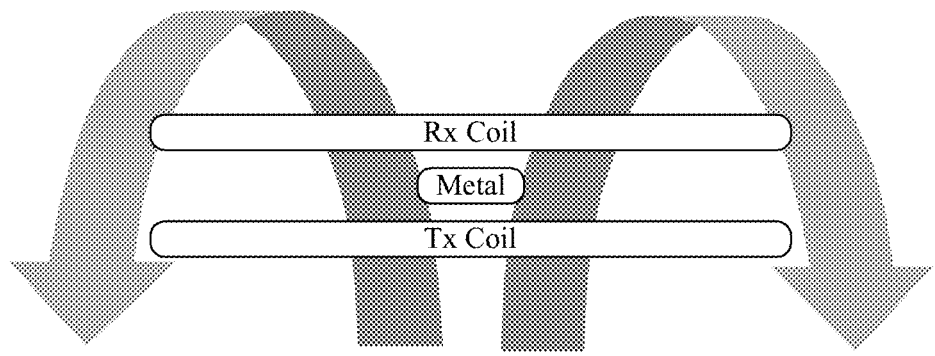

FIG. 5 illustrates a state in which conductive metal is disposed between a multi-coil type wireless power transmitting apparatus and a wireless power receiving apparatus.

The multi-coil type wireless power transmitting apparatus includes two or more primary coils of which the locations are different from each other (three primary coils of Coil 1 to Coil 3 as illustrated in FIG. 5) to simultaneously transmit the power to two or more electronic apparatuses. When the receiving apparatus deviates from, for example, the center of Coil 1, the power transmission efficiency deteriorates.

And, the receiving apparatus 200 receives a wireless power signal from the transmitting apparatus 100 and transfers to the transmitting apparatus 100 the information about electric energy received in real time. When the conductive metal, for example, a coil is disposed between the receiving apparatus and the transmitting apparatus, an eddy current phenomenon occurs depending on a change in magnetic flux passing through the conductive metal while the magnetic flux passes through the conductive metal, and as a result, power loss is generated. Therefore, a difference between received electric energy in the received power packet (RPP) transmitted from the receiving apparatus 200 and transmitted electric energy may occur. The received electric energy may vary depending on various elements including power loss by a conductor, a coupling coefficient (mutual inductance) between the primary and secondary coils, rectification efficiency of a power receiver, and the like.

The loss electric energy is calculated by subtracting the received electric energy (RPP) from transmitted electric energy (input voltage×input current). When the loss electric energy is more than, for example, 500 mW, the transmitting apparatus 100 determines that the power loss occurs due to the conductor laid between the primary coil and the secondary coil and stops the power transmission.

Alternatively, the multi-coil type transmitting apparatus 100 determines that the location of the receiving apparatus 200 laid in the coil overlapping area has been changed when the loss electric energy is higher than a predetermined reference (FOD offset) or the power transmission efficiency is low, and as a result, charging may be stopped by unnecessarily frequently performing an FOD operation to attempt switching the primary coil to another coil.

By considering such a point, in the present invention, in order to enhance a charging stop phenomenon caused by entrance into an FOD mode due to low power transmission efficiency, a reference value of the loss electric energy which is a basis for entering the FOD mode may be controlled based on a difference in signal strengths for adjacent coils.

For example, in the multi-coil type transmitting apparatus, it is assumed that a tertiary coil having a largest signal strength value indicating the magnetic flux coupling degree between the transmitting coil and the receiving coil may be selected as a power transmission coil. When a signal strength value of the secondary coil adjacent to the tertiary coil and the signal strength value of the tertiary coil are within a predetermined level, a value of the loss electric energy required to enter the FOD mode may be increased.

In the case of entering the FOD mode when the loss electric energy in the related art is 500 mW or more, when the receiving apparatus is disposed in the coil overlapping area and a difference in signal strength values between both coils is a predetermined value or less, only in the case where the value of the loss electric energy is larger than 500 mW by a predetermined value (FOD offset), the FOD may be entered. Herein, the FOD offset is a concept of compensating an efficiency deterioration portion shown as the receiving coil of the receiving apparatus is positioned outside the transmitting coil of the transmitting apparatus. A phenomenon in which charging is frequently stopped due to entrance of the FOD mode may be improved by introducing the FOD offset.

Figure 6:
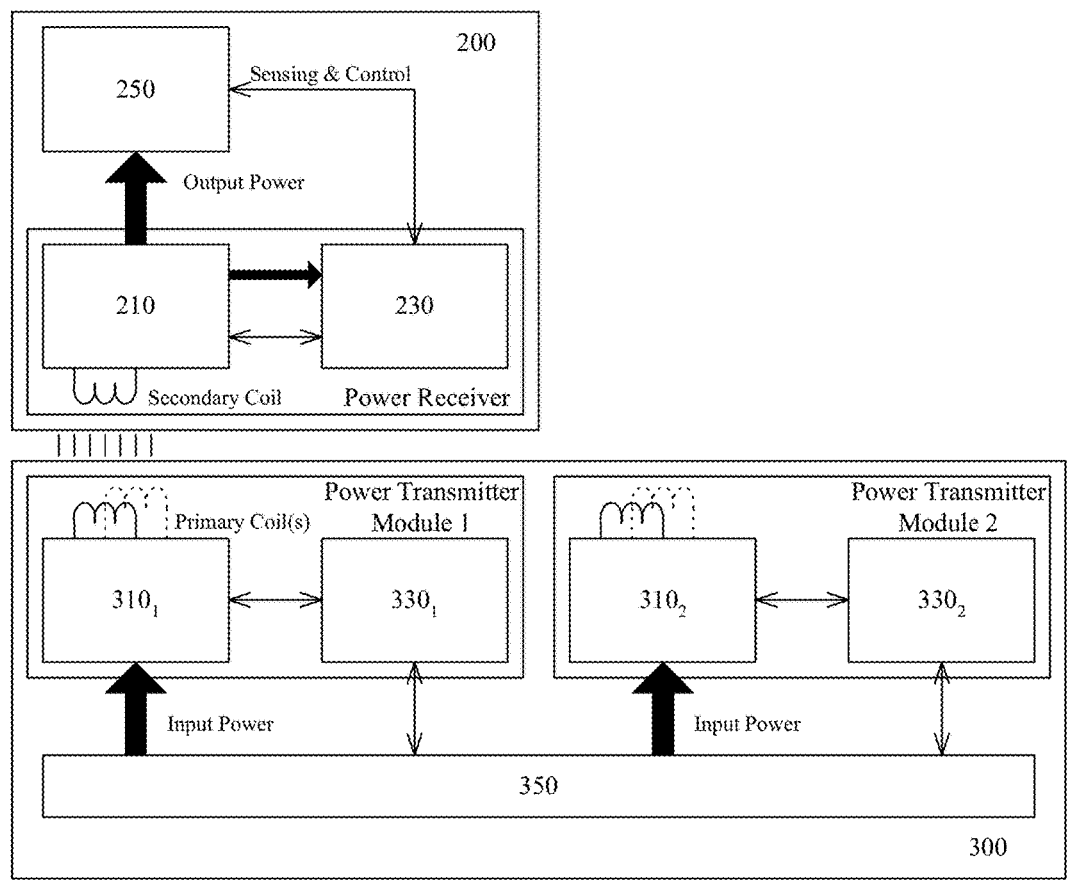
FIG. 6 illustrates a configuration of the multi-coil type wireless power transmitting apparatus to which the present invention is applied.

FIG. 6 illustrates a configuration of the multi-coil type wireless power transmitting apparatus to which the present invention is applied.

The wireless power receiving apparatus 200 may be configured to include a power receiving unit 210 constituted by the matching circuit including the secondary coil and a rectification circuit and a control unit 230 measuring an output of the power receiving unit 210 in a current or voltage form and controlling a load of the power receiving unit 210 to change the wireless power signal between the transmitting apparatus and the receiving apparatus and transmit the power control message to the transmitting apparatus. The wireless power receiving apparatus 200 is the same as the configuration of the receiving apparatus of FIG. 3 except the communication unit and the control unit are integrated into one.

The power receiving unit 210 may be configured to include a matching circuit including a secondary coil and a capacitor for receiving the wireless power signal transferred in the form of a resonated electromagnetic field, a rectification circuit for converting a power signal received in an AC form into DC while resonating, and a sensing unit detecting the electric energy of the power signal by measuring a current value or a voltage value of the DC-converted power signal. The power receiving unit 210 may further include a circuit preventing overvoltage or overcurrent from being generated by the received power signal.

The control unit 230 generates a message for controlling a characteristic of the wireless power signal based on the electric energy detected from the sensing unit of the power receiving unit 210 to transmit the message to the wireless power transmitting apparatus 100. Further, the control unit 230 may generate a message for requesting starting or finishing transmission of the wireless power and transmit the generated message to the wireless power transmitting apparatus 100.

The electronic apparatus including the wireless power receiving apparatus 200, for example, a wirelessly chargeable smart terminal may operate by receiving the power transferred from the wireless power transmitting apparatus 100 through the wireless power receiving apparatus 200 or charge a battery through a charging unit by using the transferred power and operate by using the power charged in the battery. The control unit 230 may control the charging unit to charge a charger by using the power received through the power receiving unit 210.

The multi-coil type wireless power transmitting apparatus 300 of FIG. 6 may be configured to include two or more transmitting modules including the primary coil for wirelessly transmitting the power and a system control unit for selecting one or more modules to transmit the power, connecting the module or disconnecting the module, and separately or integrally controlling an operation of the connected module. In FIG. 6, it is illustrated that the multi-coil type wireless power transmitting apparatus 300 includes two power transmitting modules.

Each power transmitting module may be configured to include a power conversion unit 310 including a resonance circuit of the primary coil and an inverter and a control unit 330 for controlling an operation of the power conversion unit 310. The control unit 330 may have a form in which the communication unit 120 and the control unit 130 are integrated as the configuration of the transmitting apparatus of FIG. 3 or be configured only by the function of the communication unit 120 and the system control unit 350 may take charge of the function of the control unit 130.

Alternatively, in the multi-coil type wireless power transmitting apparatus 300, each power transmitting module is constituted only by the resonance circuit including the primary coil and the capacitor, and the inverter is shared by respective power transmitting modules. The sensing unit for extracting the packet sent by the receiving apparatus from a change in waveform of the current that flows on the primary coil may be included in each power transmitting module or provided separately from the power transmitting module to be shared by the respective power transmitting modules. The inverter, two or resonance circuit, and the sensing unit may be collectively called the power conversion unit. A switching unit for selecting connection of the power transmitting module and the inverter and/or the sensing unit is separately provided and the system control unit 350 may select the power transmitting module by controlling the switching unit and integrally perform a role the control unit 330.

The primary coils of the power transmitting module may be differently positioned or partially overlap with each other below the flat surface of the interface of the transmitting apparatus.

The system control unit 350 controls each module to receive a power control message indicating the strength of the wireless power signal or a power control message indicating identification information of the receiving apparatus from the receiving apparatus on the surface of the interface, and verify of which module of one or more modules the receiving apparatus is close to the primary coil based on the received result, and determine through which to transmit the power.

The system control unit 350 may sense the location of the receiving apparatus 200 and determine the active area based thereon, connect the transmitting module constituting a primary cell corresponding to the active area, and control the primary coil of the corresponding transmitting module to be inductively coupled to the secondary coil of the receiving apparatus 200.

Figure 7:
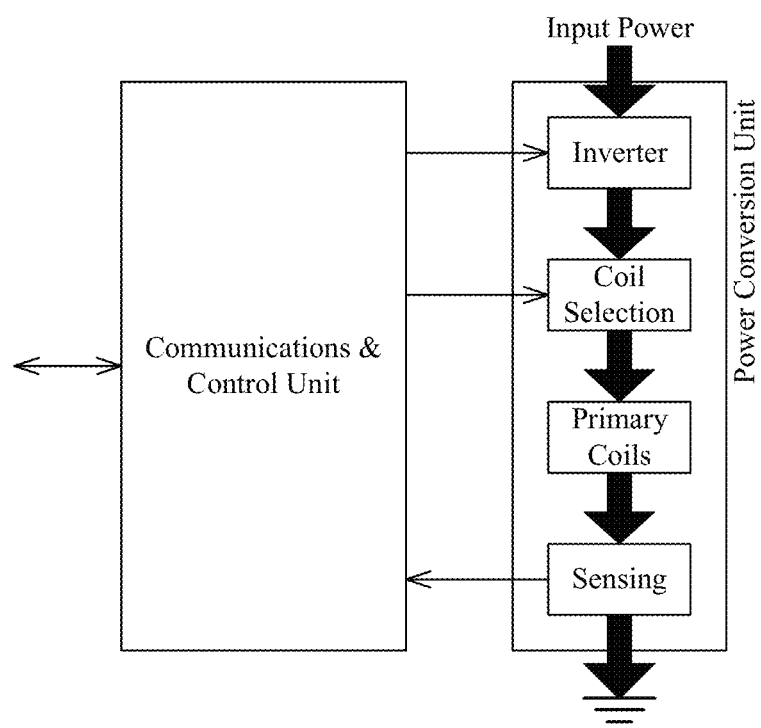
FIG. 7 conceptually illustrates a functional block for selecting a coil to be inductively coupled with a wireless receiving apparatus in the multi-coil type wireless power transmitting apparatus.

FIG. 7 conceptually illustrates a functional block for selecting a coil to be inductively coupled with a wireless receiving apparatus in the multi-coil type wireless power transmitting apparatus.

Power is supplied from a voltage source or a current source to the power conversion unit for wirelessly supplying the power to the receiving apparatus (Input Power), the supplied power is inverted into AC current with a frequency, voltage, and a duty ratio of a control point for wireless transmission according to the control of the system control unit in the inverter (Inverter), the primary coil to be magnetically inductively coupled with the receiving apparatus is selected by the system control unit (Coil Selection), the AC current generated by the inverter is applied to the selected coil to wirelessly transmit the power to the receiving apparatus (Primary Coils), current or voltage that flows through the primary coil is sensed and a change of an amplitude loaded on a waveform of current or voltage that flows through the primary coil is sensed (Sensing) to detect an actual operating point and measure a packet fed back from the receiving apparatus, a magnetic inductive coupling degree with the receiving apparatus or loss electric energy is verified based on the detected actual operating point and the verified loss electric energy and when it is determined that the loss electric energy is high due to the low magnetic inductive coupling degree, the primary coil to be coupled with the receiving apparatus is selected again to maintain the primary coil as it is or the primary coil is changed to another primary coil.

Figure 8:
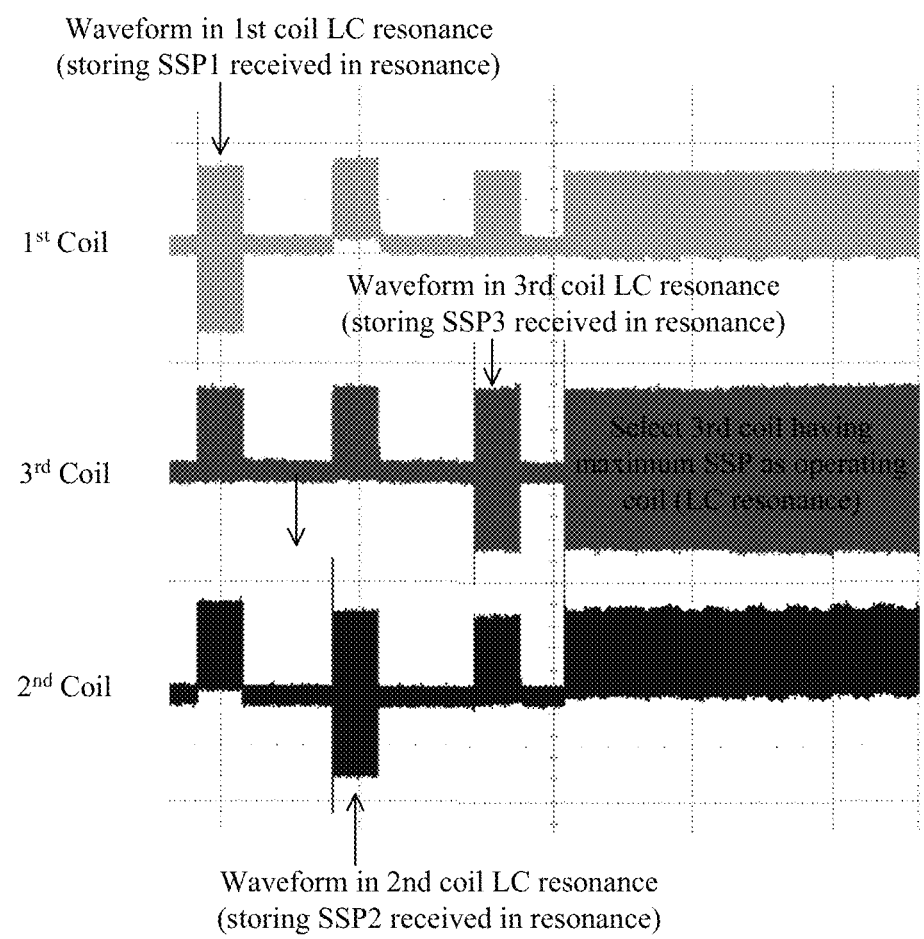
FIG. 8 illustrates a waveform measured when LC resonance is performed with respect to each primary coil in order to select an operating coil in the multi-coil type wireless power transmitting apparatus.

FIG. 8 illustrates a waveform measured when LC resonance is performed with respect to each primary coil in order to select an operating coil in the multi-coil type wireless power transmitting apparatus.

When the wireless power transmitting apparatus 300 has three primary coils of, for example, Coil 1 to Coil 3, LC resonance is sequentially caused with respect to all coils and the signal strength packet (SSP) is received and stored in each coil. In FIG. 8, a first waveform is measured in Coil 1, a second waveform is measured in Coil 3, and a third waveform is measured in Coil 3. Further, in each waveform, the earliest waveform is measured in each coil when Coil 1 is LC-resonated, the next waveform is measured in each coil when Coil 2 is LC-resonated, and the further next waveform is measured in each coil when Coil 3 is LC-resonated.

As such, when all coils are sequentially LC-resonated, the signal strength packets received in the respective coils are stored and are compared with each other to select a coil receiving the largest value as the operating coil. In FIG. 8, since a signal strength packet received when Coil 3 is LC-resonated has the largest value, Coil 3 is selected as the operating coil.

A difference value between the signal strength packet stored with respect to a coil adjacent to the coil selected as the operating coil and the signal strength packet stored with respect to the operating coil is determined and whether to apply the FOD offset is determined according to the difference value. That is, a reference value of the power loss amount for determining whether to enter the FOD mode may vary according to a difference value from the signal strength packet for the coil adjacent to the operating coil.

FIG. 9 illustrates an operational flowchart of a method in which a wireless power transmitting apparatus selects an operating coil and applies an FOD offset according to an embodiment of the present invention.

The system control unit 350 of the multi-coil type wireless power transmitting apparatus 300 senses whether the receiving apparatus 200 or the electronic apparatus including the receiving apparatus is laid on the surface of the interface (S900) and may sequentially supply the AC current to the primary coil of each power transmitting module, detect a change which occurs in a waveform of the AC current applied to the primary coil or the voltage measured by the primary coil through the sensing unit included in each module, and verify whether the receiving apparatus is laid on the surface of the interface through the detected change. Alternatively, the transmitting apparatus 300 may sense whether the receiving apparatus is laid on the top of the surface of the interface through a separate sensor.

When the receiving apparatus 200 is sensed on the surface of the interface (YES in S800), the system control unit 350 sequentially supplies the AC current to allow the induced electromotive force to be generated on the primary coil of each module by controlling the inverter while switching two or more power transmitting modules to measure and store the signal strength packet (SSP) indicating an inductive coupling degree by LC-resonating each of the plurality of primary coils and the secondary coil of the receiving apparatus (S910) and may measure an analog ping current value instead of the signal strength packet.

When the transmitting apparatus 300 includes three primary coils (power transmitting modules) of Coil 1 to Coil 3, the transmitting apparatus 300 performs a ping step with the receiving apparatus by performing the LC resonating by controlling the power transmitting module in the order of Coil 1, Coil 2, and Coil 3 and measures and stores the inductive coupling degree with the secondary coil of the receiving apparatus 200 through the performed ping step. In the ping step, the receiving apparatus 200 may transmit the signal strength packet SSP indicating the inductive coupling degree of the primary coil and the secondary coil of the power transmitting module through modulation of a resonance waveform and the system control unit 350 may extract the signal strength packet from the change in waveform of the current that flows on the primary coil through the sensing unit of the power transmitting module and decode and store the extracted signal strength packet.

The system control unit 350 may select the primary coil of the power transmitting module in which a largest value among signal strength values is measured as the operating coil (S920).

And, the system control unit 350 verifies to which active area the receiving apparatus 200 is laid in the active area corresponding on the surface of the interface by comparing a signal strength value measured in a coil adjacent to the primary coil selected as the operating coil with the signal strength value for the operating coil (S930). When a difference between the signal strength value measured in the operating coil and the signal strength value measured in the adjacent coil is large, the system control unit 350 determines that the receiving apparatus 200 is laid in the active area corresponding to the operating coil and when the difference is small, the system control unit 350 may determine that the receiving apparatus 200 is laid in an overlapping area between the operating coil and the adjacent coil.

When the difference between the signal strength value measured in the operating coil and the signal strength value measured in the adjacent coil is smaller than a predetermined value (YES in S930), it is determined that the receiving apparatus 200 is laid in the overlapping area between the operating coil and the adjacent coil and an FOD reference value of the power loss amount which becomes the basis for entering the FOD mode is adjusted upward by applying the FOD offset to the reference value to unnecessarily prevent frequent entrance into the FOD mode (S940).

Thereafter, the system control unit 350 performs an identification/configuration step as a preparation step for sending the power to the receiving apparatus to receive appropriate information from the receiving apparatus and make a power transmission contract with the receiving apparatus based on the received information. The system control unit 350 may receive an identification packet including a version, a make code, apparatus identification information, and the like of the receiving apparatus and a configuration packet including information including maximum power, a power transmitting method, and the like of the receiving apparatus from the receiving apparatus.

And, the system control unit 350 performs a power transmitting step of actually wirelessly transmitting the power by an interaction with the receiving apparatus 200 (S950). When the receiving apparatus 200 transmits a control error packet indicating a difference between an operating point to receive a power signal and an operating point determined in the power transmission contract, the system control unit 350 receives the transmitted control error packet and controls the power transmitting module based thereon to change an operating point of a resonance circuit.

The system control unit 350 receives the received power packet (RPP) from the receiving apparatus 200 and decodes the RPP while wirelessly transmitting the power to calculate received electric energy received by the receiving apparatus 200 and calculates the loss electric energy by subtracting the received electric energy from transmitted electric energy calculated by input voltage and input current and compares the calculated loss electric energy with the FOD reference value (S960).

The FOD reference value is a reference value of the power loss amount which becomes the basis for entering the FOD mode. When the difference between the signal strength value measured in the operating coil and the signal strength value measured in the adjacent coil is small, that is, when the receiving apparatus 200 is laid in the overlapping area between the operating coil and the adjacent coil, the FOD offset may be added to the FOD reference value.

When the loss electric energy is larger than the FOD reference value, the system control unit 350 may perform an FOD function for detecting whether a foreign substance is interposed between the top of the interface of the transmitting apparatus 300 and the receiving apparatus 200 (S970) and when the loss electric energy is smaller than the FOD reference value (NO in S960), the FOD function is not performed.

When a control error value included in the control error packet is small, the system control unit 350 determines that a change in control error value occurs according to a normal power transmission such as changing the operating point of the power receiving operation by the receiving apparatus 200 and performs the power transmitting step to maintain wireless power transmission, but when the control error value is large, the system control unit 350 may determine that the receiving apparatus 200 moves on the surface of the interface, temporarily stop an operation of transmitting the power to the receiving apparatus through a current module, and perform step S910 in order to determine the operating coil again.

As described above, the multi-coil type wireless power transmitting apparatus can prevent a charge stop phenomenon by the unnecessary FOD operation by preventing the FOD operation from being frequently performed even though the receiving apparatus is laid in the overlapping area of the operating coil and the adjacent coil, and as a result, the loss electric energy increases.

The present invention is not limited to the embodiments described herein, and it would be apparent to those skilled in the art that various changes and modifications might be made without departing from the spirit and the scope of the present invention. Accordingly, it will be determined that the changed examples or modified examples are included in the appended claims of the present invention.

What is claimed is:

1. A method for transmitting power wirelessly, the method comprising:
    measuring and storing signal strength values corresponding to inductive coupling degrees with a secondary coil of a wireless power receiving apparatus sequentially with respect to two or more primary coils;
    selecting a primary coil related to a largest signal strength value among the signal strength values as an operating coil;
    adjusting a reference value of a power loss amount based on a difference between a signal strength value for a primary coil adjacent to the operating coil and a signal strength value for the operating coil, wherein the reference value is a value for determining whether to enter a mode for detecting power loss; and
    transmitting power to the wireless power receiving apparatus through the operating coil,
    wherein the adjusting includes adjusting the reference value upward when the difference is smaller than a predetermined value.

2. The method for transmitting power wirelessly of claim 1, wherein the signal strength value is acquired by decoding a signal strength packet received from the wireless power receiving apparatus.

3. The method for transmitting power wirelessly of claim 1, wherein the transmitting includes:
    calculating the power loss amount, and
    entering the mode when the calculated power loss amount is larger than the adjusted reference value.

4. The method for transmitting power wirelessly of claim 3, wherein the power loss amount is calculated by subtracting received electric energy decoded from a received power packet received from the wireless power receiving apparatus from transmitted electric energy calculated using input voltage and input current.

5. An apparatus for transmitting power wirelessly, the apparatus comprising:
    a power conversion unit including an inverter for converting DC power into AC, two or more resonance circuits including a primary coil for transmitting power by magnetic inductive coupling with a secondary coil of a receiving apparatus and a sensing unit for sensing a change of a waveform in the alternative current flowing through the resonance circuit;
    a switching unit for connecting the two or more resonance circuits to the inverter; and
    a control unit for selecting a resonance circuit to be connected to the inverter by controlling the switching unit, extracting a message sent by the receiving apparatus based on the change sensed by the sensing unit, and controlling power transmission to the receiving apparatus by controlling an operation of the inverter based on the extracted message,
    wherein the control unit measures and stores signal strength values corresponding to inductive coupling degrees with a secondary coil of the receiving apparatus sequentially with respect to two or more primary coils included in the two or more resonance circuits by controlling the switching unit and the power conversion unit, selects a primary coil related to a largest signal strength value among the signal strength values as an operating coil, and adjusts a reference value of a power loss value based on a difference between a signal strength for a primary coil adjacent to the operating coil and a signal strength value for the operating coil, the reference value being a value for determining whether to enter a mode for detecting power loss, and
    wherein the control unit adjusts the reference value upward when the difference is smaller than a predetermined value.

6. The apparatus for transmitting power wirelessly of claim 5, wherein the control unit decodes a signal strength packet received from the receiving apparatus to acquire the signal strength value.

7. The apparatus for transmitting power wirelessly of claim 5, wherein the control unit calculates the power loss amount and enters the mode when the calculated power loss amount is larger than the adjusted reference value.

8. The apparatus for transmitting power wirelessly of claim 7, wherein the control unit calculates the power loss amount by subtracting received electric energy decoded from a received power packet received from the receiving apparatus from transmitted electric energy calculated using voltage and current which are input in the resonance circuit including the operating coil.

* * * * *